United States Patent [19]
Hanado et al.

[11] Patent Number: 6,050,896
[45] Date of Patent: Apr. 18, 2000

[54] GAME IMAGE DISPLAY METHOD AND GAME DEVICE

[75] Inventors: Akimitsu Hanado; Junji Shibasaki; Akira Matsubayashi; Yasunobu Hirai, all of Tokyo, Japan

[73] Assignee: Sega Enterprises, Ltd., Tokyo, Japan

[21] Appl. No.: 08/801,086

[22] Filed: Feb. 14, 1997

[30] Foreign Application Priority Data

Feb. 15, 1996 [JP] Japan ................................. 8-027781

[51] Int. Cl.[7] .................................................. A63B 71/00
[52] U.S. Cl. ............................................. 463/32; 463/30
[58] Field of Search ................................ 463/23, 30, 31, 463/32, 33, 34; 345/427, 419, 425; 382/277, 285, 302

[56] References Cited

U.S. PATENT DOCUMENTS

| | | | |
|---|---|---|---|
| 4,179,824 | 12/1979 | Marsh | 35/10.24 |
| 4,423,870 | 1/1984 | Bristow | 463/31 |
| 4,600,200 | 7/1986 | Oka et al. | 463/2 |
| 4,905,147 | 2/1990 | Logg | 463/31 |
| 5,077,608 | 12/1991 | Dubner | 345/419 |
| 5,684,937 | 11/1997 | Oxaal | 395/127 |
| 5,734,807 | 3/1998 | Sumi | 463/32 |

*Primary Examiner*—Jessica J. Harrison
*Assistant Examiner*—John M. Hotaling, II
*Attorney, Agent, or Firm*—Dickstein Shapiro Morin & Oshinsky LLP

[57] ABSTRACT

A game image display method displays display objects in a virtual three dimensional space on a display screen. A three dimensional space coordinate system 200 fixed to a reference plane 200, and a three dimensional view point coordinate system 300 to follow a movement of a view point 500, and a two dimensional projection coordinate system 400 defined in relationship with the view point coordinate system 300 are set. Display objects 202–208 belonging to the space coordinate system 200, and display objects 302–304 belonging to the view point coordinate system 300 are projected on the projection coordinate system 400 to display the display objects. A two dimensional judgement coordinate system 350 corresponding to the projection coordinate system 400 is set in the view point coordinate system 300 to judge a collision between the display objects 202–208, 302–304, based on positions of the display objects 202–208, 302–304 projected on the judgement coordinate system 350. The game image display method can conduct image display suitable for 3D games which gives the 3D games suitable difficulty and makes display images thereof realistic to make the 3D games amusing.

10 Claims, 16 Drawing Sheets

GAME IMAGE DISPLAY METHOD AND GAME DEVICE

BACKGROUND OF THE INVENTION

The present invention relates to a game image display method for displaying a display object arranged in a virtual three dimensional space, and a game device.

With the recent progress of computer graphic technique, the so-called 3D (three dimensional) games using three dimensional image display have become usual in game devices in amusement facilities and domestic video game devices.

However, in the conventional 3D games, e.g., a shooting game, moving display objects, such as a player's plane operated by a player, an enemy plane, etc. are 3D (three dimensionally) displayed, but stationary objects, such as a background, are 2D (two dimensionally) displayed for ensuring image processing speed.

As described above, conventionally even in a 3D game all display objects are not 3D displayed.

On the other hand, the recent drastic improvement of the computer processing speed makes it technically possible to 3D display all display objects including the background, and real 3D games in which all display objects are 3D displayed are expected. Some of fighting games appear as real 3D displayed games.

However, in studying conventional 3D game, the present inventors found that in a case of a 3D game in which images of a player's plane and an enemy plane flying around in a vast space, for example, in a shooting game are displayed, and the display is generally watched from above as a bird's-eye view, mere 3D display of all the display objects causes various inconveniences as a game. For example, in a case of a shooting game, disadvantageously it is very difficult for a player to shoot down an enemy plane. Further, although a shell has not actually hit an enemy plane, it looks as if it had hit the enemy plane on the display screen.

SUMMARY OF THE INVENTION

An object of the present invention is to provide an image data display method and a game device which can remove these disadvantages, and can display images suitably for 3D games.

Another object of the present invention is to provide a game device having suitable difficulty, and makes games amusing by realistic display images.

The above-described object is achieved by a game image display method for displaying a display object arranged in a virtual three dimensional space on a display screen, the method comprising: setting a three dimensional space coordinate system, a three dimensional view point coordinate system which is to follow a movement of a view point, and a two dimensional projection coordinate system; and coordinate transforming the space coordinate system expressing a display object and/or the view point coordinate system expressing a display object into the projection coordinate system where the display object on the display screen is viewed from a predetermined view point. According to this method, the inconvenience of the display object being largely moved corresponding to a movement of the view point can be removed, which prevents a game from becoming too difficult, and image display suitable for 3D games can be conducted.

The above-described object is achieved by a game image display method for displaying a display object arranged in a virtual three dimensional space, the method comprising: setting a three dimensional space coordinate system and a two dimensional projection coordinate system; coordinate transforming the space coordinate system expressing a display object into the projection coordinate system where the display object is viewed from a predetermined view point; and judging a collision of the display object based on coordinate values of the transformed coordinate system.

In the above-described game image display method, it is preferable that the judgement of the collision of the display object is based on specific one of the coordinate values of the transformed coordinate system.

In the above-described image display method, it is preferable that under a predetermined condition, the display object belonging to the space coordinate system is moved to the view point coordinate system; and under a predetermined condition, the display object belonging to the view point coordinate system is moved to the space coordinate system.

The above-described object is achieved by a game device for displaying a display object arranged in a virtual three dimensional space, the game device comprising: coordinate setting means for setting a three dimensional space coordinate system, a three dimensional view point coordinate system which is to follow a movement of a view point, and a two dimensional projection coordinate system; and projection display means for coordinate transforming the space coordinate system expressing a display object and/or the view point coordinate system expressing a display object into the projection coordinate system where the display object on the display screen is viewed from a predetermined view point. According to this game device, the inconvenience of a player feeling dubious of a judgement of a hit can be removed, and image display suitable for 3D games can be conducted.

The above-described object is achieved by a game device for displaying on a display screen a display object arranged in a virtual three dimensional space, the game device comprising: coordinate transformation means for setting a three dimensional space coordinate system and a two dimensional projection coordinate system to coordinate transform the space coordinate system expressing a display object into the projection coordinate system where the display object viewed from at a predetermined view point; and collision judging means for judging a collision judging a collision of the display object based on coordinate values of the projection coordinate system transformed by the coordinate transformation means.

In the above-described game device, it is preferable that the collision judging means judges the collision of the display object based on specific one of the coordinate value of the transformed projection coordinate system.

In the above-described game device, it is preferable that the game device further comprises display object moving means for moving, under a predetermined condition, the display object belonging to the space coordinate system to the view point coordinate system, and for moving, under a predetermined condition, the display object belonging to the view point coordinate system to the space coordinate system.

DETAILED DESCRIPTION OF THE INVENTION

Figure 1:
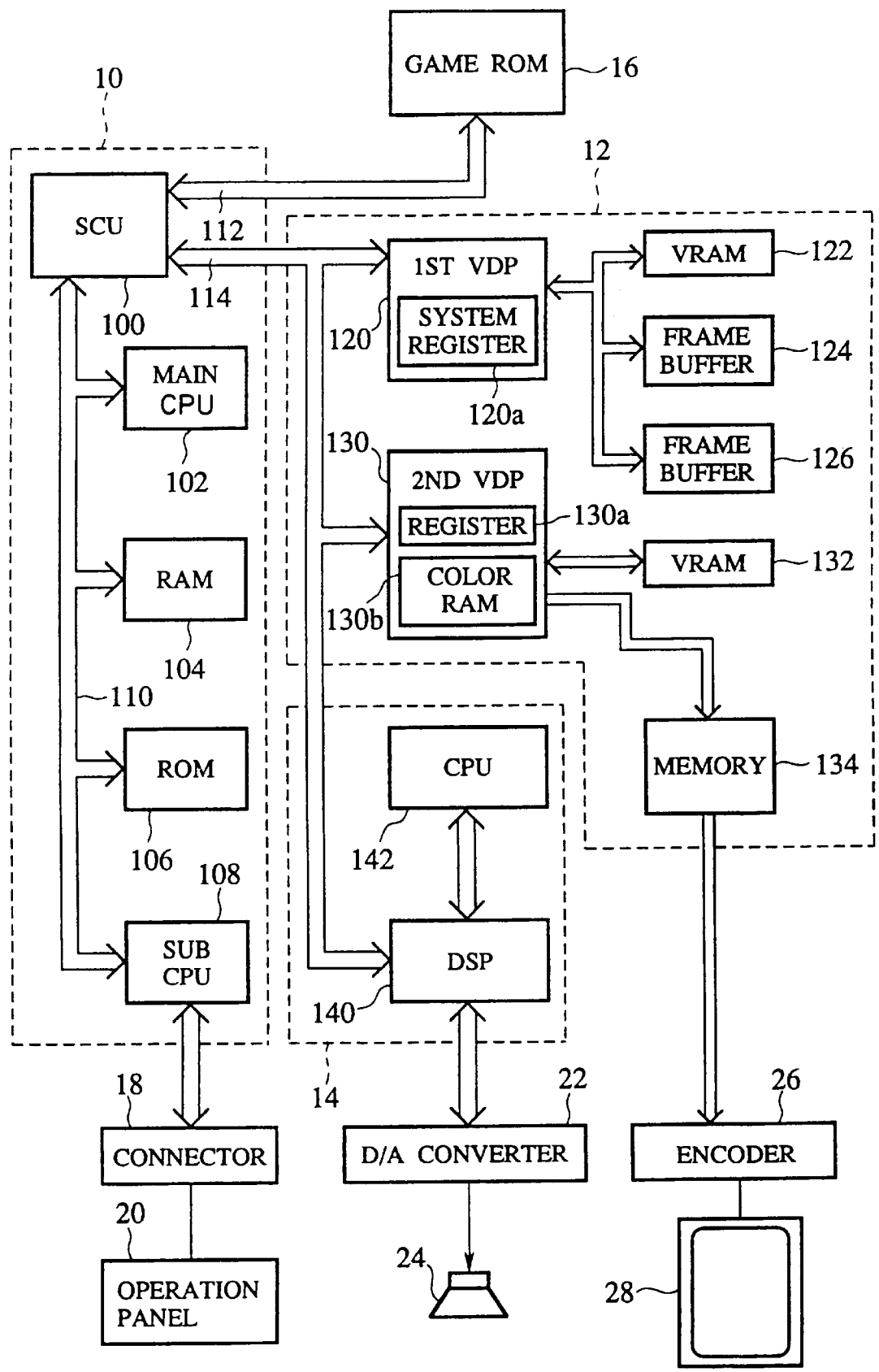
FIG. 1 is a block diagram of a game device according to an embodiment of the present invention.
Figure 2:
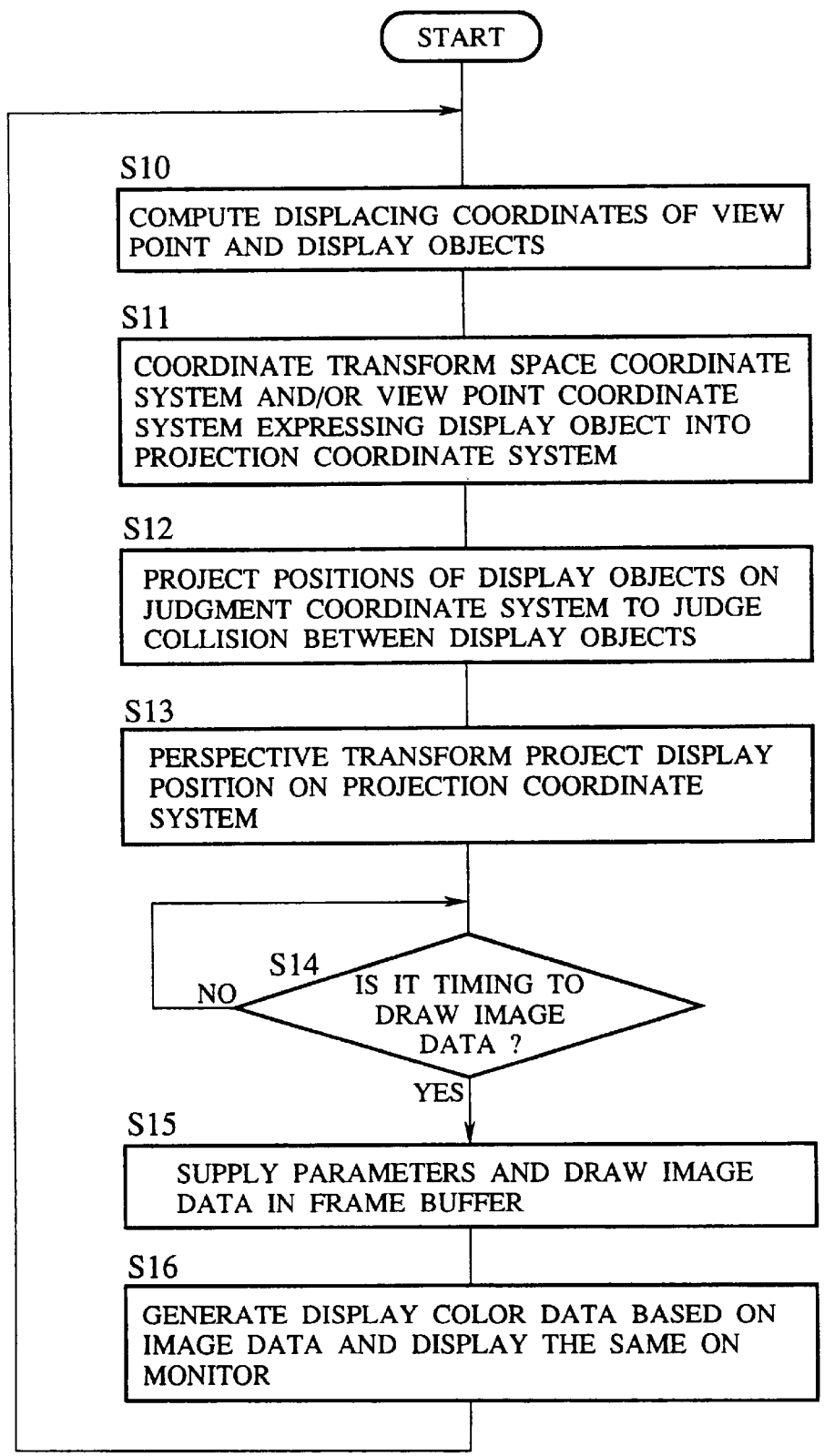
FIG. 2 is a flow chart of image data display processing of the game device according to the embodiment of the present invention.

The game device according to an embodiment of the present invention will be explained with reference to FIGS. 1 to 16. FIG. 1 is a block diagram of the game device according to the present embodiment. FIG. 2 is a flow chart of an image data display processing of the game device according to the present embodiment. FIGS. 3 to 16 are views explaining the image data display processing of the game device according to the present embodiment.

A structure of the game device according to the present embodiment will be explained with reference to FIG. 1.

The game device comprises a main control unit 10 which generally controls the device, a display control unit 12 which controls display on a game screen; and an audio-control unit 14 which produces operational sounds, etc.

The main control unit 10 includes an SCU (System Control Unit) 100, a main CPU 102, a RAM 104, a ROM 106 and a sub-CPU 108 which are interconnected by a bus 110.

The SCU 100 is connected to a game ROM 16 storing a game program through a bus 112. and is connected to the display control unit 12 and the audio-control unit 14 through a bus 114. Through buses 110, 112, 114 the SCU 100 controls input and output of data among the main CPU 102, VDPs 120, 130, a DSP 140 and a CPU 142.

The main CPU 102 has the similar computing function as a DSP (Digital Signal Processor) incorporated therein to execute at high speed the game program stored in the game ROM 16.

The RAM 14 is used as a work area of the main CPU 102. The game program and character data are temporarily stored in the RAM 104.

The ROM 16 stores programs and data, such as initial programs for initialization, which are common with various games.

An operation panel 20 is connected to the sub-CPU 108 via a connector 18. A joy stick and various buttons (not shown) to be operated by a player are provided on the operation panel 20. The sub-CPU 108 is called SMPC (System Manager & Peripheral Control) to receive operation data from the operation panel in response to a command from the main CPU 102 to supply the same to the main CPU 102.

The main CPU 102 conducts image control, as of rotational transformation, perspective transformation, etc., of characters in a game display. The image control will be detailed later.

The display control unit 12 includes the first VDP 120 which draws polygonal displays, as of characters and backgrounds comprised of polygon data, a VRAM 122 and frame buffers 124, 126 connected to the first VDP 120, the second VDP 130 which writes scroll background displays, and conducts image synthesis of polygon image data and scroll image data in accordance with display priority, and clipping, and a VRAM 132 and a memory 134 connected to the second VDP 130. The first VDP 120 and the second VDP 130 are connected to each other through the bus 114.

The first VDP 120 has a system register 120a built in. Polygon data indicative of characters are supplied to the first VDP 120 through the main CPU 102 and written in the VRAM 122. The image writing data written in the VRAM 122 are drawn in the frame buffer 122 or 124 for image writing. The data drawn in the frame buffer 122 or 124 are supplied to the second VDP 130 in the display mode. Thus by the use of the two frame buffers 122, 124, the image drawing and the display are switched for each frame.

On the other hand, information for controlling image drawing is supplied via the SCU 100 from the main CPU 102 to be set in the system register 120a. In accordance with the control information set in the system register 120a the first VDP 120 controls image drawing and display.

The second VDP 130 has a register 130a and a color RAM 130b built in. Image data are supplied from the main CPU 102 through the SCU 100 to be set in the VRAM 132 and the color RAM 130b. Information for controlling image display are supplied from the CPU 102 through the SCU 100 to be set in the register 130a of the second VDP 130. The data set in the VRAM 132 are read in response to the control information set in the register 130a of the second VDP 130 to be image data of scroll display for backgrounds for characters. Image data for respective scroll display, and polygon data of characters supplied from the first VDP 120 have display priorities in response to the control information set in the register 130a, and are synthesized to be final display image data.

Color data set in the color RAM 130b are read by the second VDP 130 based on display image data to generate color data and store them in the memory 134.

The display color data stored in the memory 134 are outputted to an encoder 26. The encoder 26 adds synchronization signals to the image data to generate video signals, and outputs the video signals to the monitor 28. The monitor 28 displays a game display.

The audio-control unit 14 includes the DSP 140 which conducts audio-synthesis by PCM mode or FM mode, and the CPU 142 which controls the DSP 140. Audio data generated by the DSP 140 are converted to audio signal by a D/A converter 22 to be outputted to a speaker 24.

Then, image data display processing of the game device according to the present embodiment will be explained with reference to the flow chart of FIG. 2 and the explanatory view of FIG. 3.

The image data display processing will be explained by a 3D shooting game as an example of game contents to be played on the present embodiment. In the sky above a city where a lot of buildings tower, a player operates his own plane to fight with an enemy plane, avoiding a shell from a cannon disposed on the roof of the building, and destroys the city. The plane proceeds in the sky above the city, moving or displacing a view point left and right, and thus the game proceeds.

Figure 3:
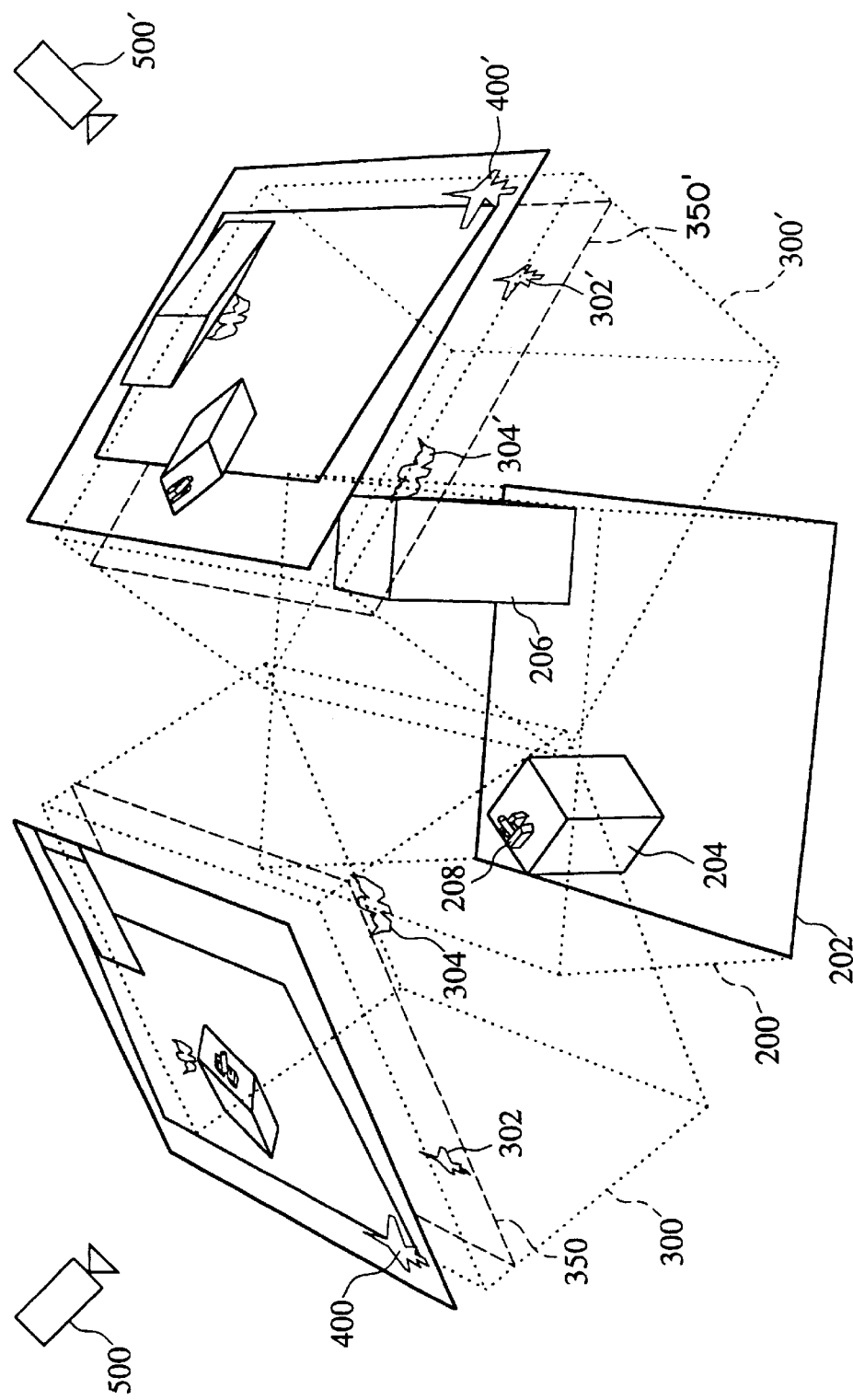
FIG. 3 is an explanatory view of the image data display processing of the embodiment of the present invention.

In the present embodiment, as shown in FIG. 3, a three dimensional coordinate system comprises a space coordinate system 200 fixed to a ground 202 which is a reference ground and a view point coordinate system following a movement of a view point 500. Further, a two dimensional projection coordinate system 400 for projecting a display object is defined in relationship with the view point coordinate system 300.

Display objects, such as buildings 204, 206, a cannon 208, which are located near the ground 202 belong to the space coordinate system 200. Display objects, such as a player's plane operated by the player 302, an enemy plane 304, which are located remote from the ground 202, belong to the view point coordinate system 300.

A two dimensional judgement coordinate system 350 corresponding to the projection coordinate system 400 is set in the view point coordinate system 300. Based on positions of the display objects projected on the judgement coordinate system 350, a collision between the display objects is judged. Specific one of the display objects belonging to the view point coordinate system 300 belong to the judgement coordinate system 350.

A method for image data display processing of the present embodiment will be explained with reference to FIG. 2.

First, in response to operational inputs in the operation panel 20, displacing coordinates of a view point, displacing coordinates of polygon data of the player's plane 302, the enemy plane 304, the buildings 204, 206, the cannon 208, etc. are computed (Step S10).

Then, the main CPU 102, which functions as the coordinate conversion means, conducts coordinate transformation so that positions of the display objects, such as the buildings 204, 206, the cannon 208, are projected on the projection coordinate system 400, and also conducts coordinate transformation so that positions of the display objects, such as the player's plane 302, the enemy plane 304, belonging to the view point coordinate system 300 are projected on the projection coordinate system 400 (Step S11).

Then, the main CPU 102, which functions as collision judging means, projects positions of display objects, such as the buildings 204, 206, the cannon 208, belonging to the space coordinate system 200, and positions of specific ones, such as the players's plane 302, the enemy plane 304, of the display objects belonging to the view point coordinate system 300 are projected to the judgement coordinate system 350, and based on the projected positions of the display objects, the collision judging means judges a collision between the display objects (Step S12).

Then, the main CPU 102, which functions as the projecting display means, conducts perspective transformation so that the respective display object which has been subjected to the coordinate transformation in Step S11 is projected on the projection coordinate system 400 (Step S13).

Next, the main CPU 102 stands by, judging whether or not it is timing to draw the polygon data of the display objects on the projection coordinate system 400 (Step S14).

Next, when the main CPU 102 finds that it is timing to draw the polygon data, supplies the parameters obtained based on the above calculation to the first VDP 120 to write the polygon data in the VRAM 122 and draw the image data in the frame buffer 12 or 14 (Step S15).

Then the main CPU 102 supplies a display command to the second VDP 130. The second VDP 130 generates display color data in accordance with the image data to write the display color data in the memory 134. Based on the display color data, the encoder 26 generates video signals, and the monitor 28 displays the video signals (Step S16).

The main CPU 102 repeats thee above-described Steps S10 to S16 to display three dimensional image data of display objects.

In the above-described image data display processing method, the coordinate transforming of the three dimensional coordinate system, such as the space coordinate system, the view point coordinate system, into the two dimensional coordinate system, such as the projection coordinate system, is performed by means of perspective projection technique for projecting lines emanating from a perspective center (view point) which is placed a finite distance apart, not by means of parallel perspective from a perspective center (view point) which is placed an infinite distance apart. In displaying display objects in a game image, it is preferable that the view point is placed the finite distance apart. This results in a powerful game image being obtained, and in a player being able to easily grasp a distance between display objects, e.g., a player's plane and an enemy plane from a game image. On the contrary, in case of the infinite view point, a game image does not sufficiently produce a spatial effect, thus a player can not easily grasp a distance between display objects from a game image.

Next, image data display processing of the game device according to the present embodiment will be detailed with reference to FIGS. 3 to 16.

First, image data display in a case that the view point is moved or displaced left and right will be explained with reference to FIGS. 3 to 6.

In the present embodiment, when the view point 500 on the left side is moved to a view point 500' on the right side by a player's operation or a game setting, the view point coordinate system 300 on the left side is moved to a view point coordinate system 300' on the right side in accordance with the movement of the view point. The projection coordinate system 400 and the judgement coordinate system 350 are also moved to a projection coordinate system 400' and a judgement coordinate system 350' on the right side.

Figure 4B:
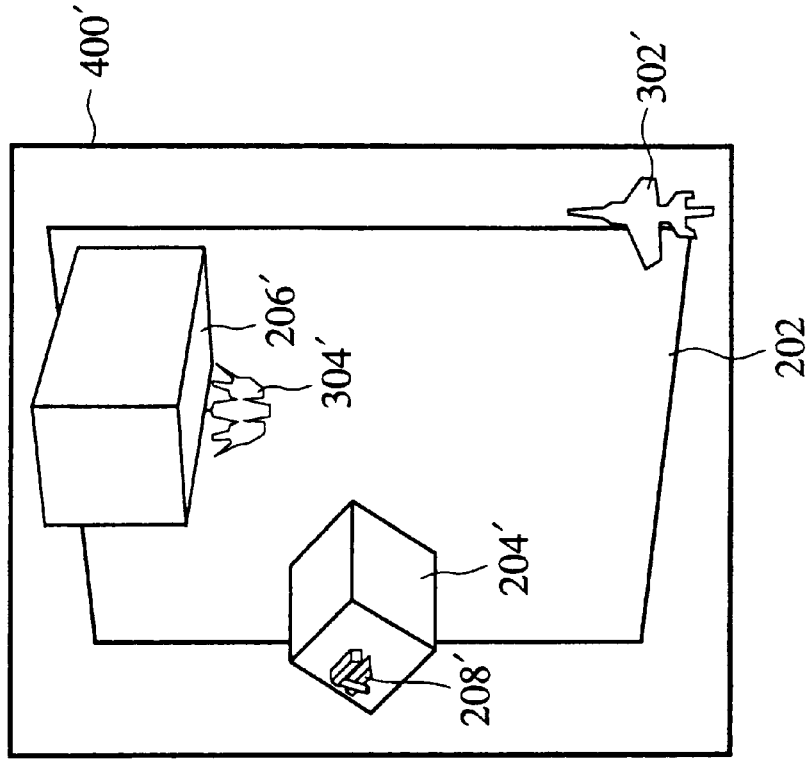
FIGS. 4A and 4B are views of a projected display image in FIG. 3.
Figure 4A:
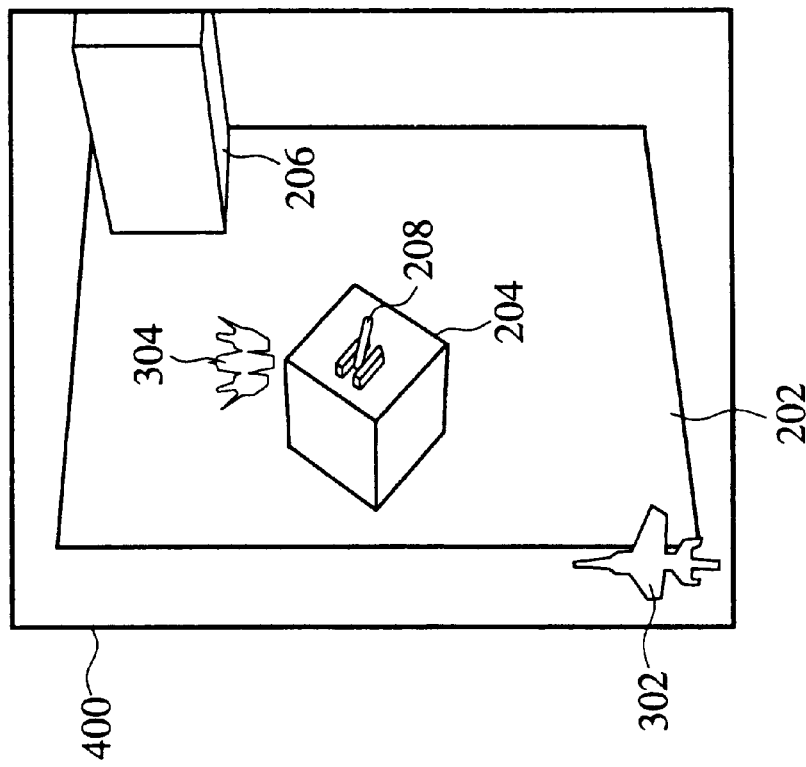

At this time, in the present embodiment, not only the player's plane 302 operated by the player, but also the enemy plane 304 in the air belong to the view point coordinate. Accordingly, when the view point is moved from left to right, display positions of the display objects (the ground 202, the buildings 204, 206 and the cannon 208) belonging to the space coordinate system 200 are largely changed based on accurate three dimensional display as shown in FIGS. 4A and 4B, but display positions of the display objects (the player's plane 302 and the enemy plane 304) belonging to the view point coordinate system 300 are not largely changed. This facilitates aiming the enemy plane 304 to shoot it down.

Unless the view point coordinate system is provided, as is in the present embodiment, a position of a display object (the enemy plane 304) in the air is largely moved in accordance with a movement of the view point, which makes it very difficult to aim the display object. This will be explained with reference to FIGS. 5 and 6.

Figure 5:
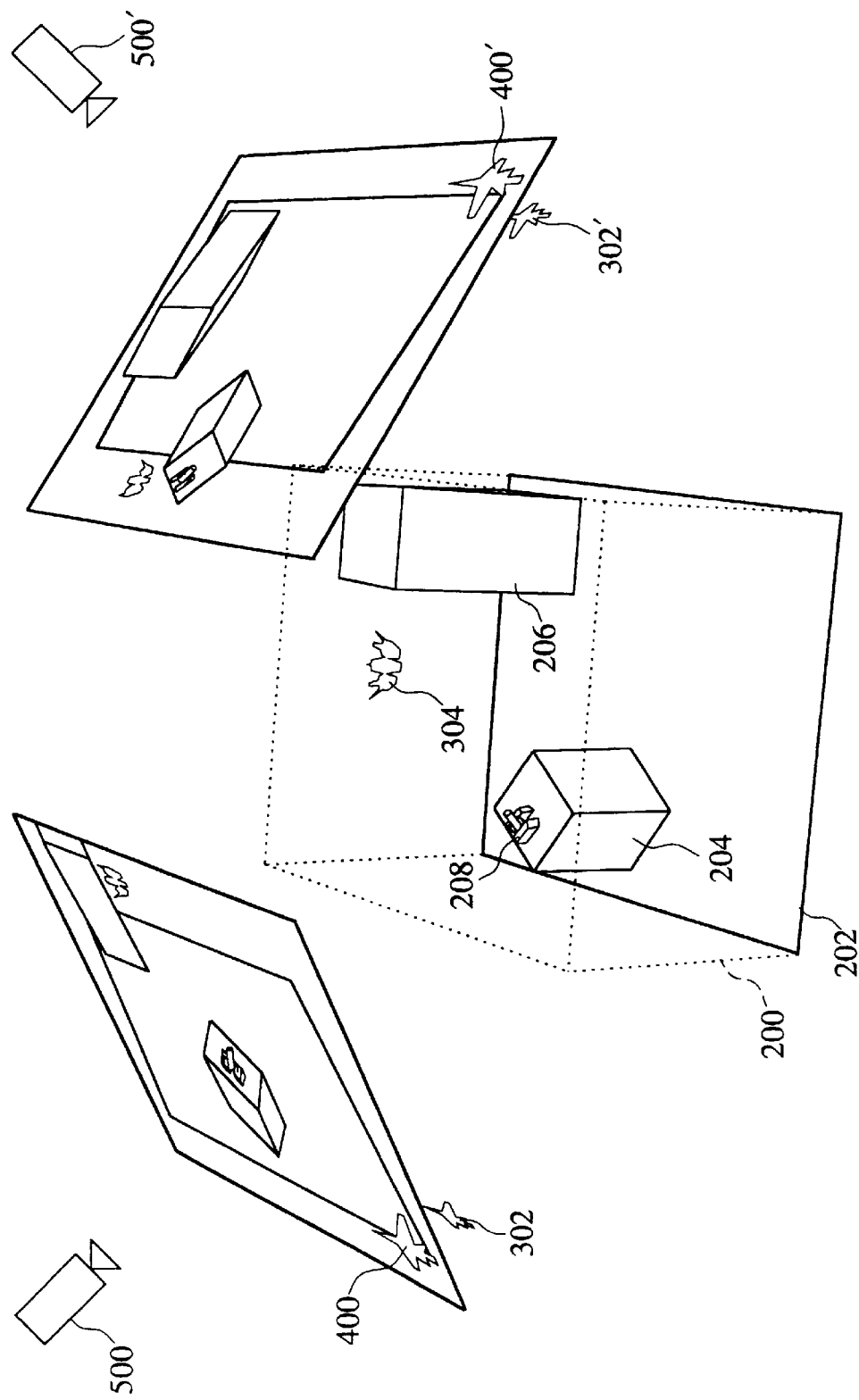
FIG. 5 is an explanatory view of image data display processing without the use of the view point coordinate system.
Figure 6B:
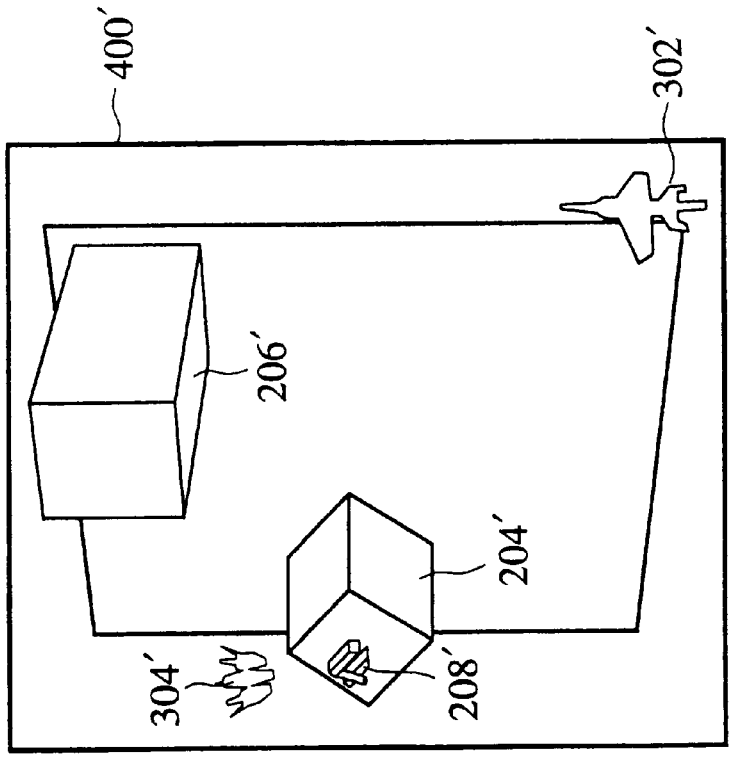
FIGS. 6A and 6B are views of the projected display images in FIG. 5.
Figure 6A:
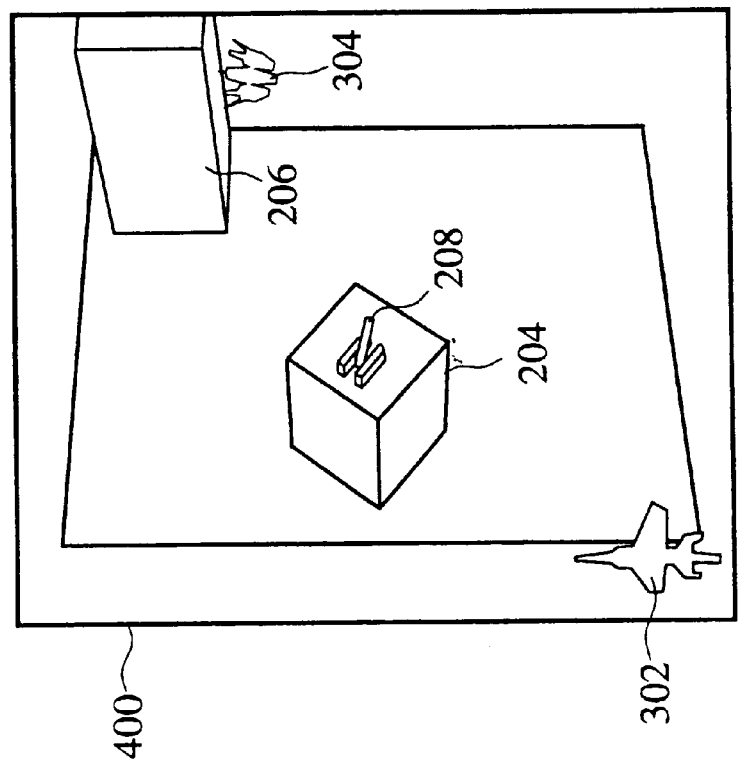

As shown in FIG. 5, only the space coordinate system 200 fixed to the ground 202 which is the reference plane is provided as the three dimensional coordinate system, and all the display objects (the ground 202, the buildings 204, 206, the cannon 208 and the enemy plane 304) except the player's plane 302 belong to the space coordinate system 200. When the view point 500 on the left side is moved to the right view point on the right side by a player's operation or a game setting, the projection coordinate system 400 is moved to the projection coordinate 400' following the movement of the view point. When the view point is moved from right to left, display positions of all the display objects (the ground 202, the buildings 204, 206, the cannon 208 and the enemy plane 304) are largely changed based on accurate three dimensional display as shown in FIGS. 6A and 6B. A display position of the display object (the enemy plane 304) in the air is largely changed from the right end of the display screen (FIG. 6A) to the left end of the display screen (FIG. 6B). Accordingly, in shooting down the enemy plane 304, it is very difficult to aim at the enemy plane 304.

According to the present embodiment, the display object in the air (the enemy plane 304) belongs to the view point coordinate system 300 to move the display object in accordance with movement of the view point, whereby even when the view point is moved largely left to right, a position of the display object in the air (the enemy plane 304) is not largely changed with a result that the game can have suitable difficulty.

Next, image data display processing in a case that display objects go up will be explained with reference to FIGS. 7 to 10.

Figure 7:
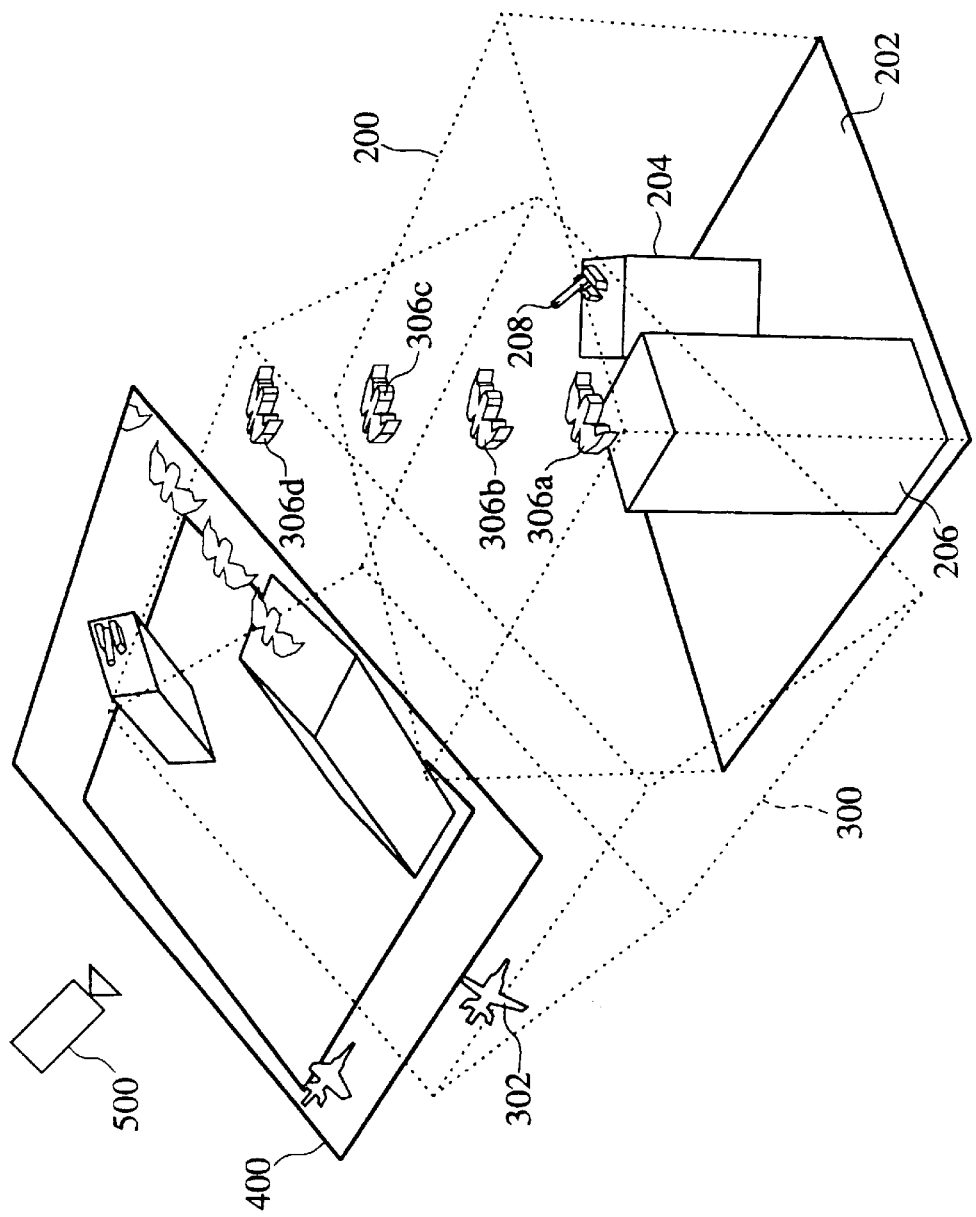
FIG. 7 is an explanatory view of image data display processing without movement of a display object from the stationary coordinate system to the view point coordinate system.
Figure 8:
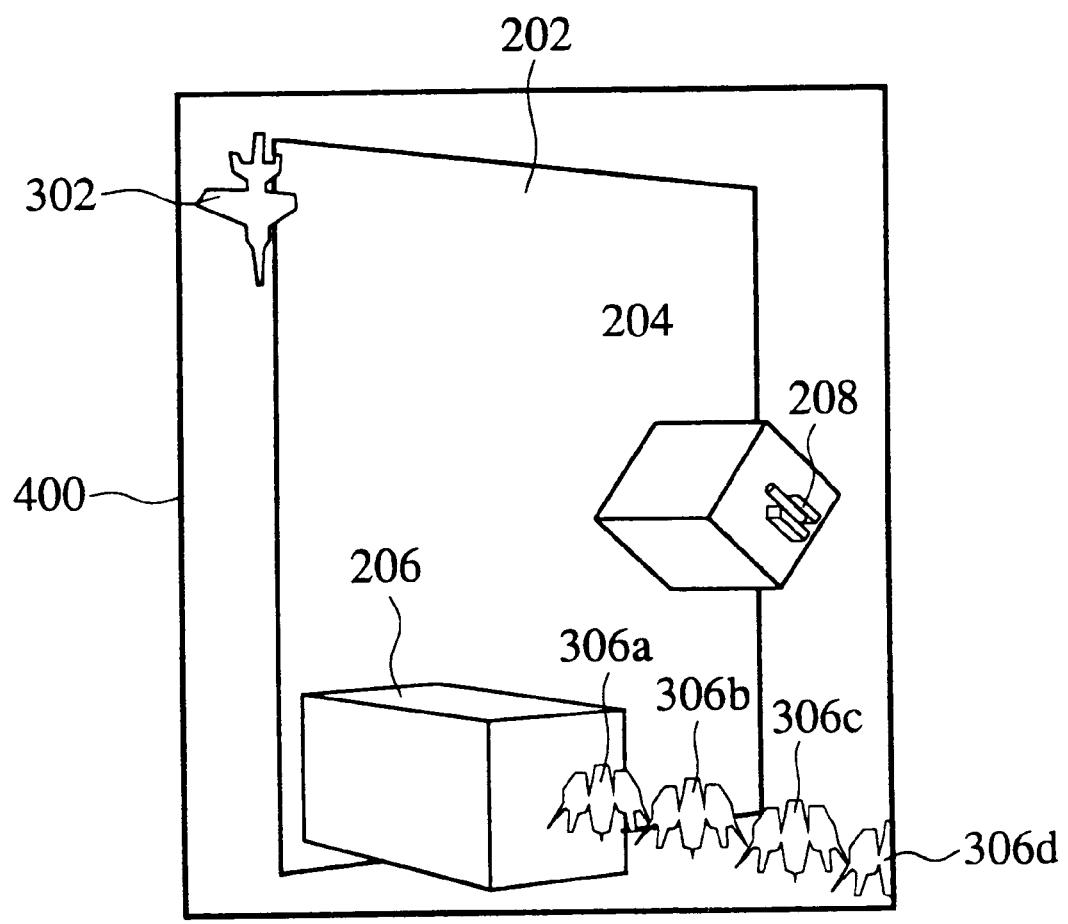
FIG. 8 is a view of projected display images in FIG. 7.

At the beginning, an enemy plane 306a is located on the roof of a building 206. The building 206 and the enemy plane 306i abelong to the space coordinate system 200. Then, when the enemy plane 306 takes off from the roof of the building 206, as shown in FIG. 7, enemy planes 306b, 306c, 306d which go up are left in the space coordinate system 200 as they have been, whereby the display image shown in FIG. 8 is obtained. In accordance with the ascent of the enemy plane 306a, display positions on the projection coordinate system 400 are largely changed with a result that the ascending enemy plane 306d finally goes out of the display screen. Accordingly the player cannot aim the enemy plane 306d. When the player moves the view point 500 to aim the enemy plane 306d which has gone out of the display screen, the movement of the view point 500 further changes a display position of the enemy plane 306d. It is thus impossible to aim the enemy plane 306d.

In the present embodiment, when a display object belonging to the space coordinate system 200 goes up, the display object is moved from the space coordinate system 200 to the view point coordinate system 300, whereby the above-described inconvenience is removed.

Figure 9:
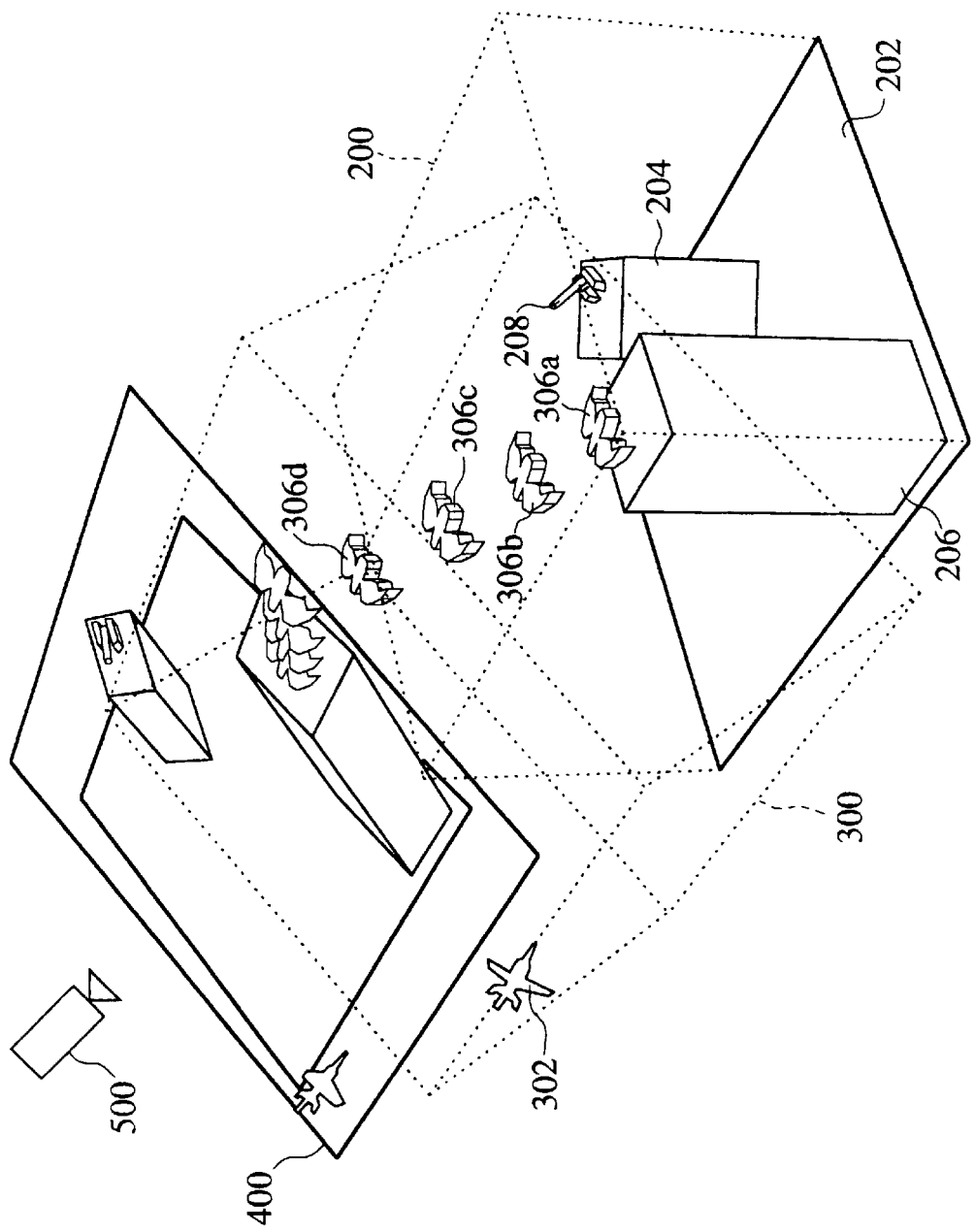
FIG. 9 is an explanatory view of image data display processing with movement of a display object from the stationary coordinate system to the view point coordinate system.
Figure 10:
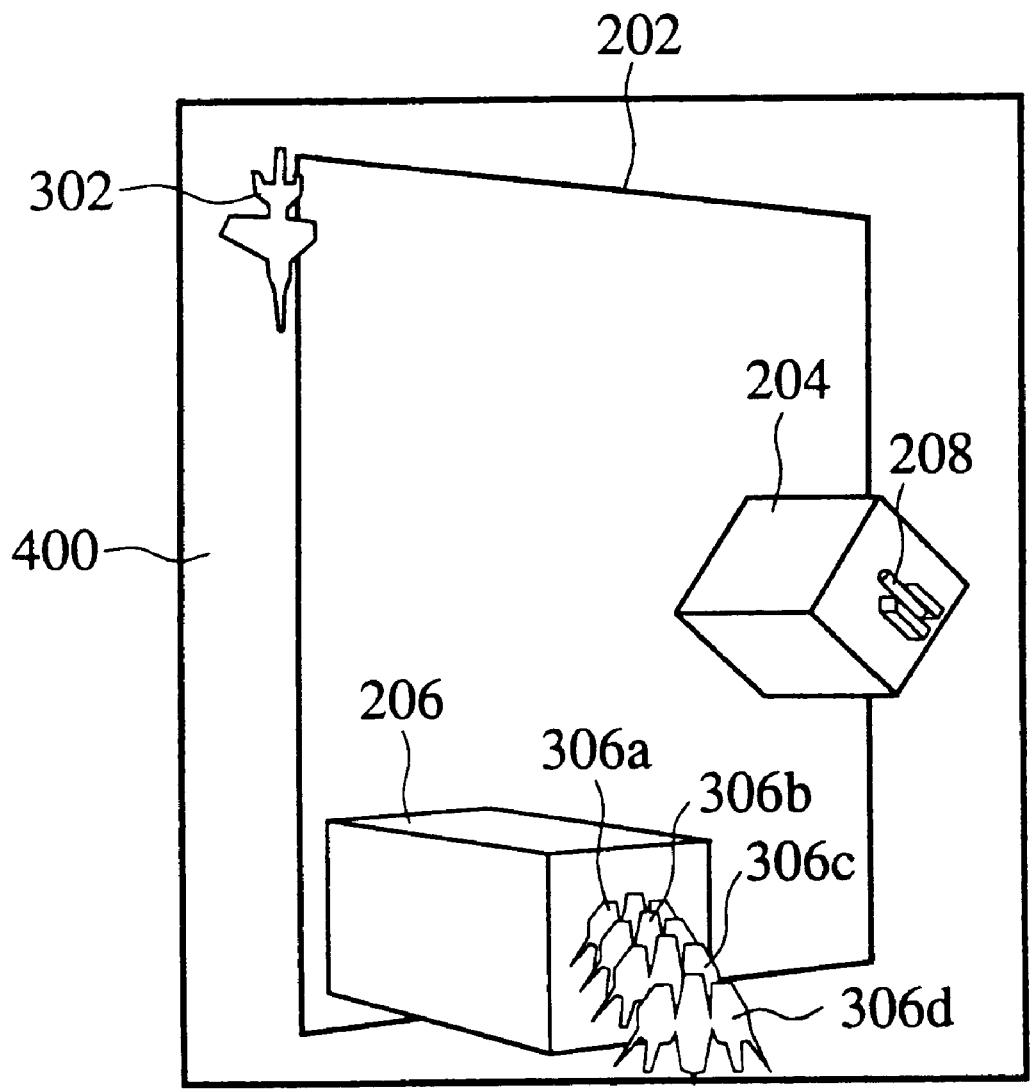
FIG. 10 is a view of projected display image in FIG. 9.

In a case that at the beginning the enemy plane 306a is located on the roof of the building 206, both the building 206 and the enemy plane 306a belong to the space coordinate system 200. Then, when the enemy plane 306a takes off from the roof of the building 206, the main CPU 102, which functions as the display object displacing means, moves, as shown in FIG. 9, the ascending enemy planes 306b, 306c, 306d to the view point coordinate system 300. When the enemy planes come to belong to the view point coordinate system 300, display positions of the ascending enemy planes 306b, 306c, 306d on the projection coordinate system 400 are not substantially changed as shown in FIG. 10. Accordingly the ascending enemy plane 306d does not go out of the display screen, and the player can aim at the enemy plane 306d with suitable difficulty without displacing the view point.

In the present embodiment, display objects belonging to the space coordinate system 200 are moved to the view point coordinate system 300 under a predetermined condition, and display objects belonging to the view point coordinate system 300 are moved to the space coordinate system under a predetermined condition. The predetermined condition is, e.g., that when a display object starts to ascend, or when a display object at pause starts to move, the display object belonging to the space coordinate system 200 is moved to the view point coordinate system 300, or that when a moving display object is descending to be located below a set level or when a moving display object is stopped, the display object belonging to the view point coordinate system 300 is moved to the space coordinate system 200.

Then, image data display processing in connection with the judgement of hit of a shell will be explained with reference to FIGS. 11 to 16.

In a 3D shooting game, display objects belonging to the three dimensional coordinate systems are monitored on a display projected on the two dimensional projection coordinate system. Accordingly, although a shell has not actually hit an object in the three dimensional space, sometimes on the display the shell looks as if it had hit the object.

Figure 11:
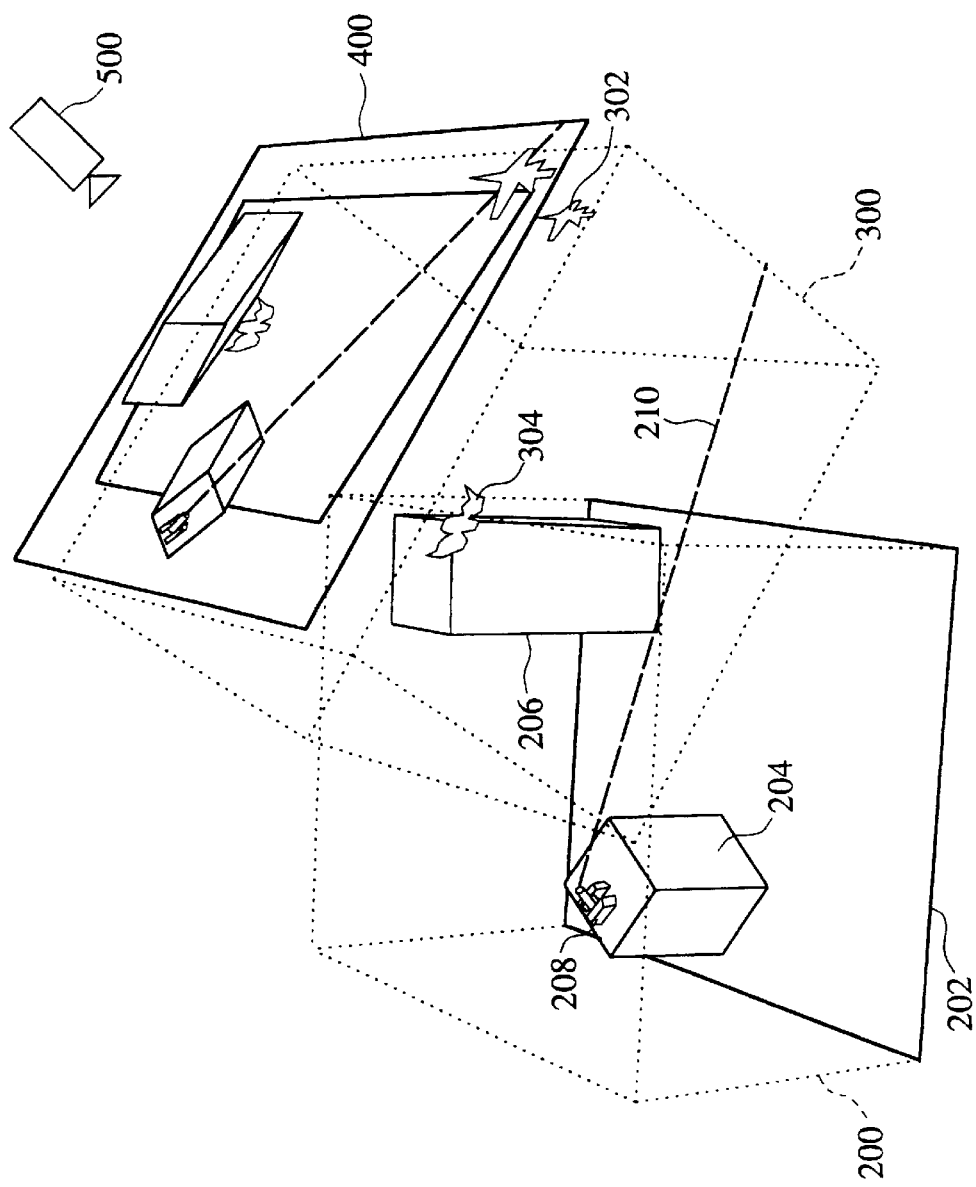
FIG. 11 is an explanatory view of image data display processing for judging a collision without using the judgement coordinate system.
Figure 12:
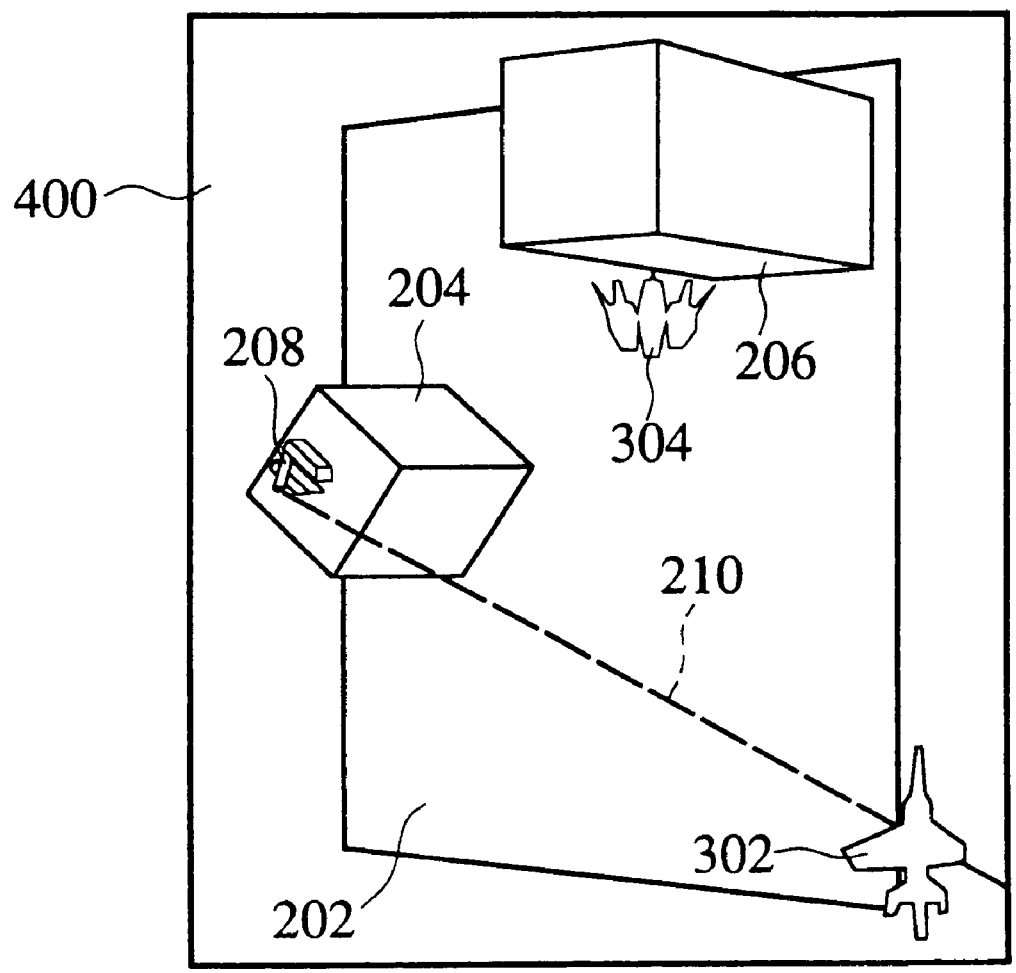
FIG. 12 is a view of the projected display image in FIG. 11.

For example, as shown in FIG. 11, when a shell fired from the cannon 208 on the roof of the building 204 depicts a ballistic 210, indicated by the broken line, in the three dimensional coordinate space, the ballistic 210 is too low with respect to the player's plane 302 to hit the same. However, the display image projected on the projection coordinate system 400 shows, as shown in FIG. 12, the shell appears as if it had hit the player's plane 302. A shell is so small that it is very difficult to three dimensionally judge, even based on a fine display image, whether the shell has or has not hit an object. This is especially the case when, although a shell fired by a player has not actually hit, the shell appears on a display as if it had hit, causing trouble with accurate game play.

Figure 13:
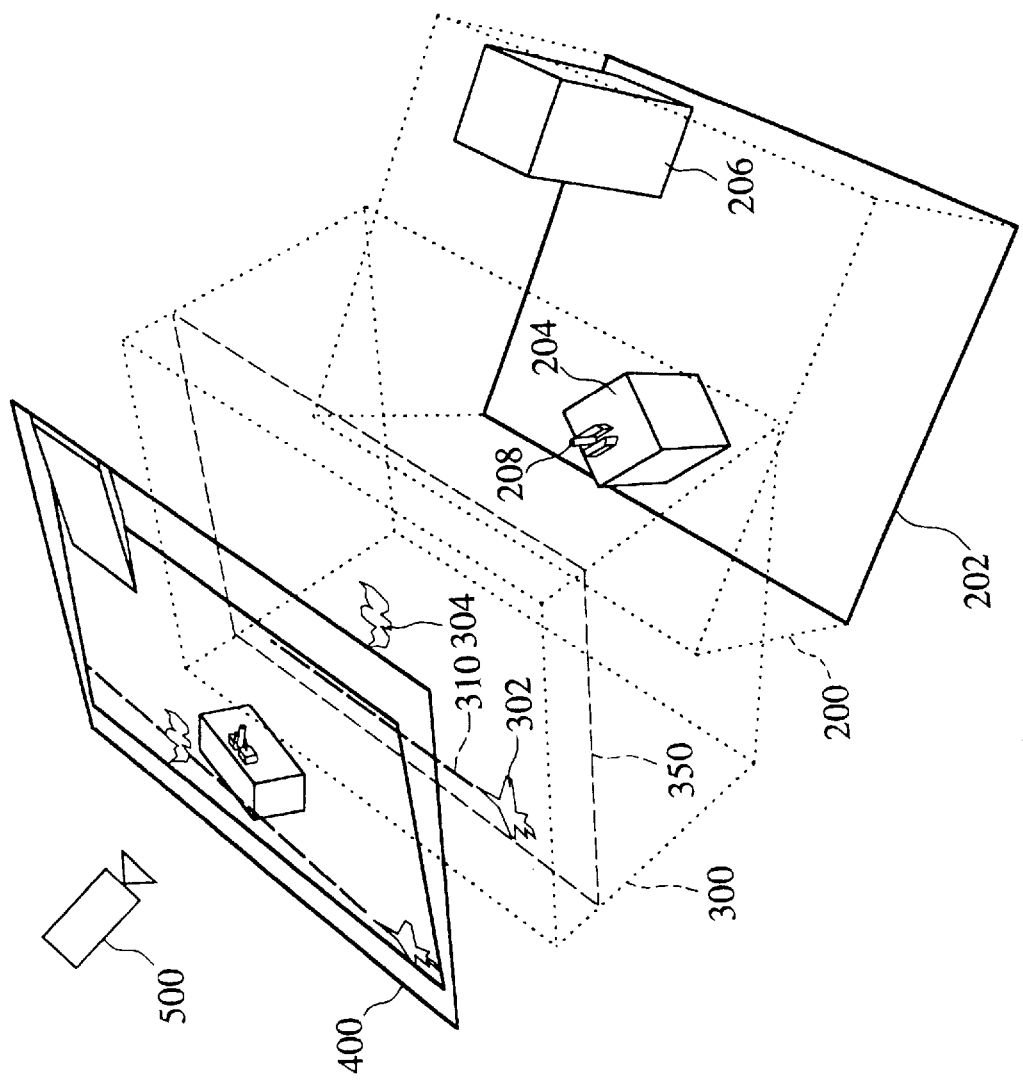
FIG. 13 is an explanatory view of one example of image data display processing for judging a collision with using the judgement coordinate system.
Figure 14:
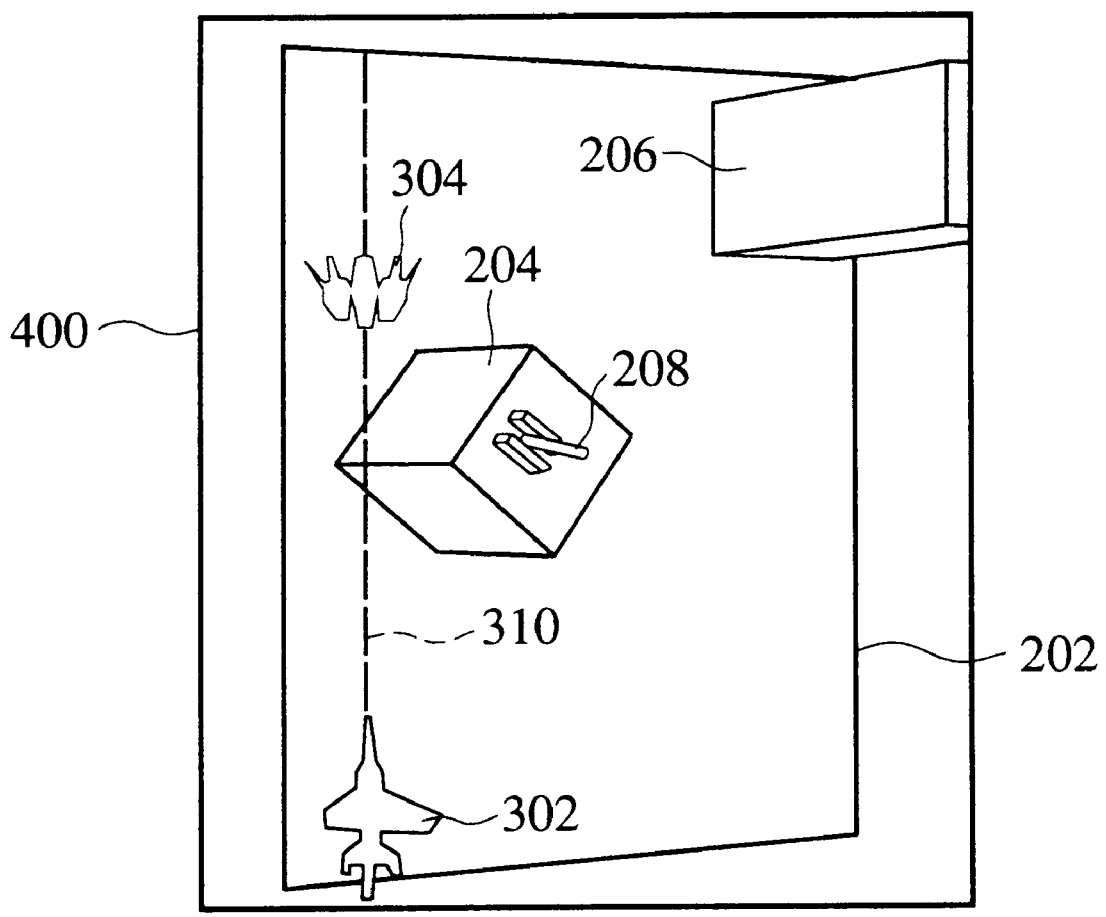
FIG. 14 is a view of the projected display image in FIG. 13.

As a countermeasure to this, in the present embodiment, for the judgement of a collision between display objects, such as the judgement of whether an object is as shown in FIG. 13, a judgement coordinate system 350 associated with the projection coordinate system 400 is provided in the view point coordinate system 300. The judgement of a collision between display objects is based on the positions of the display objects projected on the judgement coordinate system 350. Even in a case that a shell has not actually hit in the three dimensional coordinate space, the shell is judged to have hit if the shell has hit in a projected image on the judgement coordinate system 350.

For example, as shown in FIG. 13, in a case that a shell is fired from the player's plane 302 and depicts a ballistic 310, the ballistic 310 has actually hit the enemy plane 304 in the three dimensional coordinate system. When the enemy plane 304 is projected onto; in the projected image on the judgement coordinate system 350 the ballistic 310 appears to 2-D intersect the enemy plane 304, and the shell would thus be judged to have hit. In the display projected on the 2-D projection coordinated system 400 shown in FIG. 14, the display that the ballistic 310 intersects the enemy plane 304, which makes the shell look as if it had hit, and a judgement of the shell having hit agree with each other. Accordingly the player can play the game without feeling embarrassed.

Figure 15:
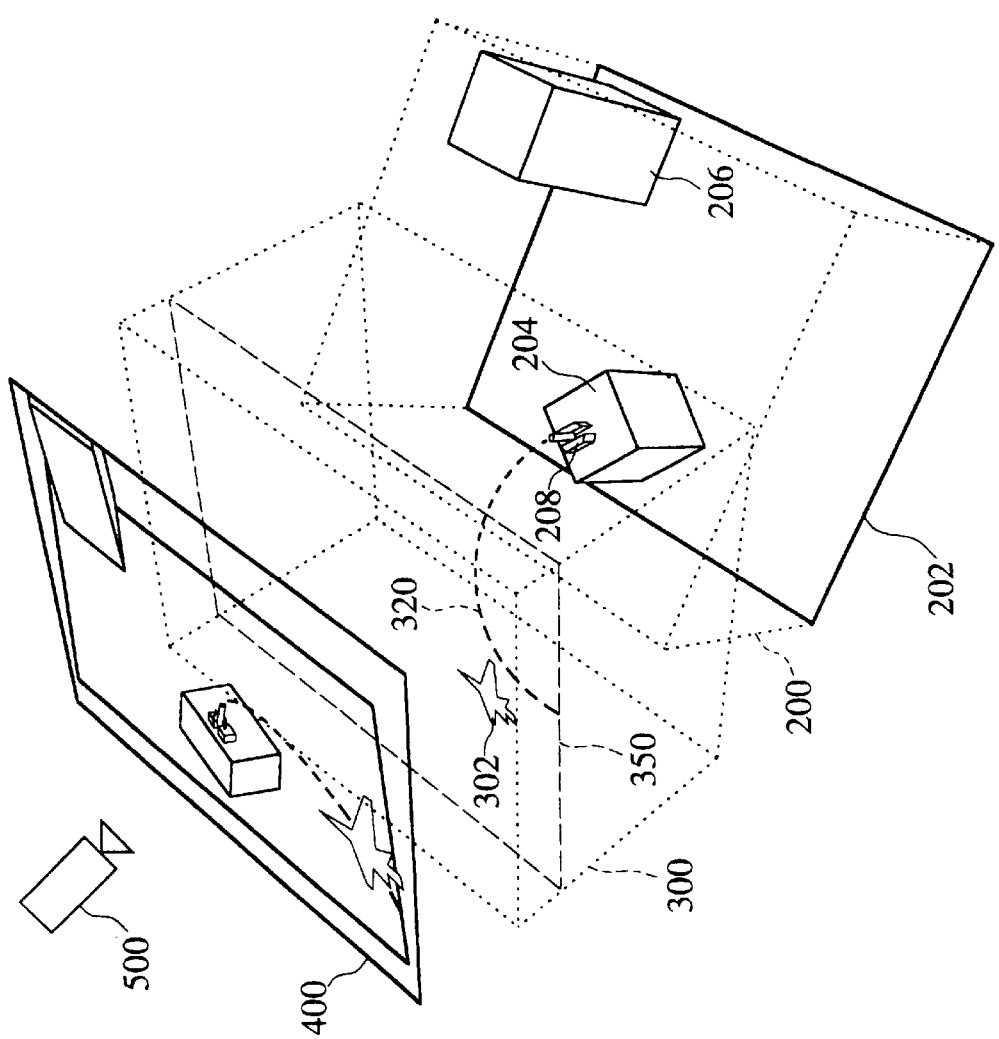
FIG. 15 is an explanatory view of another example of the image data display processing with the collision judgement using the judgement coordinate system.
Figure 16:
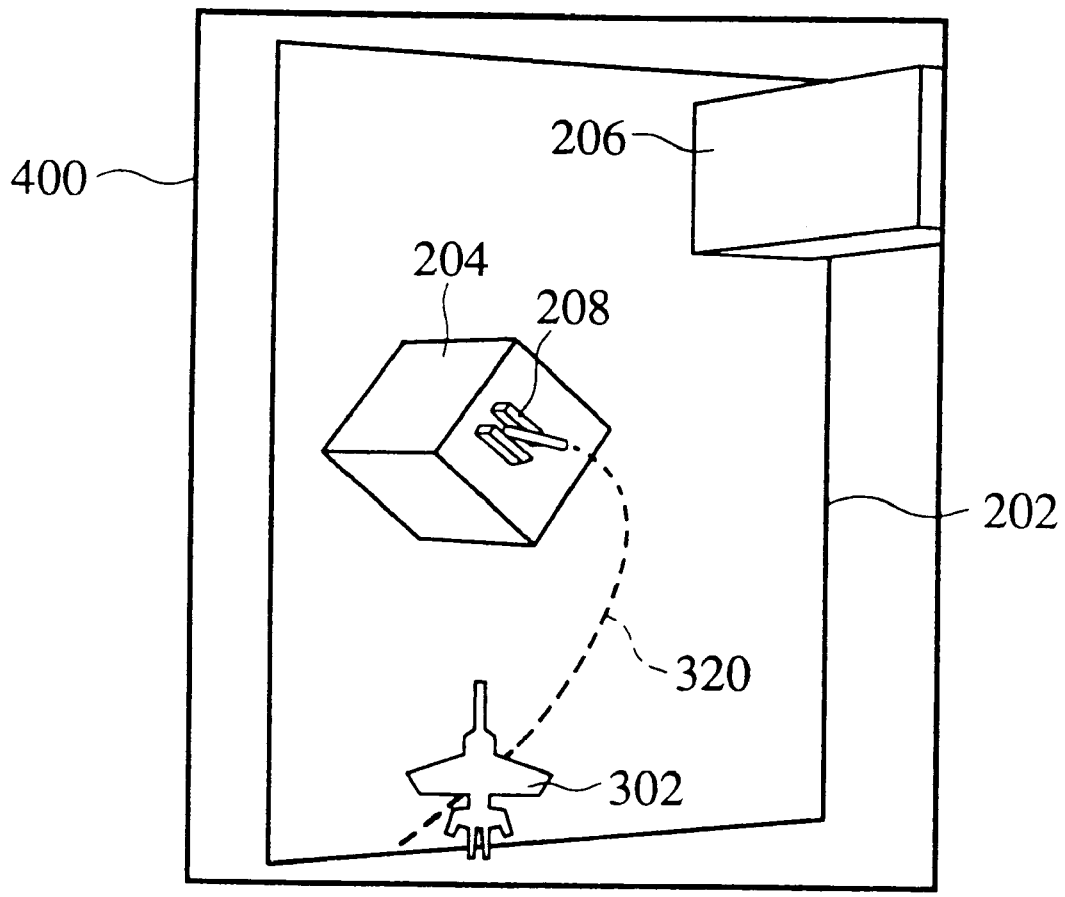
FIG. 16 is a view of the projected display image in FIG. 15.

As shown in FIGS. 15 and 16, even in a case that the ballistic 320 of a shell is three dimensional, the same judgement of a hit can be conducted. In FIG. 15, in a case that a tracing shell is fired to the player's plane from the cannon 208 on the roof of the building 204 and depicts the curved ballistic 320, the ballistic 320 on the view point coordinate system 300 has not hit the plane 302 on the space coordinate system 200. In the projected image on the judgement coordinate system 350 the ballistic 320 intersects the plane 302, and the shell is judged to have hit. In the display projected on the projection coordinated system 400 shown in FIG. 16, the display that the ballistic 320 passed the plane 302, which makes the shell look as if it had missed, and a judgement of the shell having missed agree with each other. Accordingly the player can play the game without feeling embarrassed.

As described above, the present embodiment can remove various inconveniences caused by displaying display objects simply three dimensionally that games are made too difficult, the judgement of a hit making players dubious, etc., and can display images suitable for 3D games. Accordingly games can have suitable difficulty, and realistic display images make games amusing.

The present invention is not limited to the above-described embodiment and covers other various modifications.

For example, in the above-described embodiment, the view point is moved only right to left, but a movement axis of the view point may be arbitrarily set. The view point may be rotated.

In the above-described embodiment, the present invention is applied to a 3D shooting game but may be applied to other 3D games in which the view points are displaceable. The present invention is not essentially applied to games and may be applied to any image data processing in which a view point is moved.

What is claimed is:

1. A game image display method for displaying a display object arranged in a virtual three dimensional space on a display screen, the method comprising:

setting a three dimensional space coordinate system, a three dimensional view point coordinate system which is to follow a movement of a changing view point, and a two dimensional projection coordinate system; and coordinate transforming the three-dimensional space coordinate system expressing a display object and/or the three-dimensional view point coordinate system expressing a display object into the two-dimensional projection coordinate system where the display object on the display screen is viewed from a predetermined view point.

2. A game image display method for displaying a display object arranged in a virtual three dimensional space, the method comprising:

setting a three dimensional space coordinate system, a three dimensional view point coordinate system which is to follow a movement of a changing view point, and a two dimensional projection coordinate system;

coordinate transforming the three-dimensional space coordinate system expressing a display object into the two-dimensional projection coordinate system where the display object is viewed from a predetermined view point; and judging a collision of the display object based on coordinate values of the transformed coordinate system.

3. A game image display method according to claim 2, wherein the judgement of the collision of the display object is based on specific one of the coordinate values of the transformed coordinate system.

4. A game image display method for displaying a display object arranged in a virtual three-dimensional space on a display screen, the method comprising:

setting a three dimensional space coordinate system, a three dimensional view point coordinate system which is to follow a movement of a view point, and a two dimensional projection coordinate system;

coordinate transforming the three-dimensional space coordinate system expressing a display object and/or the three-dimensional view point coordinate system expressing a display object into the two-dimensional projection coordinate system where the display object on the display screen is viewed from a predetermined view point wherein, under a predetermined condition, the display object belonging to the space coordinate system is moved to the view point coordinate system; and under a predetermined condition, the display object belonging to the view point coordinate system is moved to the space coordinate system.

5. A game device for displaying a display object arranged in a virtual three dimensional space, the game device comprising:

coordinate setting means for setting a three dimensional space coordinate system, a three dimensional view point coordinate system which is to follow a movement of a changing view point, and a two dimensional projection coordinate system; and projection display means for coordinate transforming the space coordinate system expressing a display object and/or the view point coordinate system expressing a display object into the projection coordinate system where the display object on the display screen is viewed from a predetermined view point.

6. A game device for displaying on a display screen a display object arranged in a virtual three dimensional space, the game device comprising:

coordinate transformation means for setting a three dimensional space coordinate system and/or a three dimensional view point coordinate system which is to follow a movement of a changing view point and a two dimensional projection coordinate system to coordinate transform the space coordinate system expressing a display object into the two-dimensional projection coordinate system where the display object is viewed from at a predetermined view point; and collision judging means for judging a collision judging a collision of the display object based on coordinate values of the projection coordinate system transformed by the coordinate transformation means.

7. A game device according to claim 6, wherein the collision judging means judges the collision of the display object based on specific one of the coordinate value of a transformed projection coordinate system.

8. A game device for displaying a display object arranged in a virtual three dimensional space, the game device comprising:

coordinate setting means for setting a three dimensional space coordinate system, a three dimensional view point coordinate system which is to follow a movement of a view point, and a two dimensional projection coordinate system, projection display means for coordinate transforming the space coordinate system expressing a display object and/or the view point coordinate expressing a display object into the projection coordinate system where the display object on the display screen is viewed from a predetermined view point; and display object moving means for moving, under a predetermined condition, the display object belonging to the space coordinate system to the view point coordinate system, and for moving, under a predetermined condition, the display object belonging to the view point coordinate system to the space coordinate system.

9. A storage medium storing a program for carrying out a game image display method according to claim 1.

10. A storage medium storing a program for carrying out a game image display method according to claim 2.

* * * * *